(12) United States Patent
Lange

(10) Patent No.: US 6,276,398 B1
(45) Date of Patent: Aug. 21, 2001

(54) INFLATABLE PACKER FOR REPAIRING CONDUITS

(75) Inventor: Frederick M. Lange, Ft. Myers, FL (US)

(73) Assignees: Frederick Lange, Ft. Myers; Joseph R. Joy, Naples, both of FL (US)

( * ) Notice: Subject to any disclaimer, the term of this patent is extended or adjusted under 35 U.S.C. 154(b) by 0 days.

(21) Appl. No.: 09/593,236

(22) Filed: Jun. 14, 2000

(51) Int. Cl.$^7$ .................................................. F16L 55/16
(52) U.S. Cl. ............................ 138/98; 138/93; 156/287; 264/269
(58) Field of Search ........................ 138/97, 98, 93; 156/287, 94; 264/269; 405/50.1

(56) References Cited

U.S. PATENT DOCUMENTS

| | | | |
|---|---|---|---|
| 2,583,316 | 1/1952 | Bannister | 138/97 X |
| 2,672,162 | 3/1954 | Brauer | 138/97 |
| 3,168,908 | 2/1965 | Zurbrigen et al. | 138/97 |
| 3,175,618 | 3/1965 | Lang et al. | 138/97 X |
| 3,750,711 | 8/1973 | Conklin et al. | 138/97 |
| 3,762,446 | 10/1973 | Tungseth et al. | 138/97 |
| 3,830,260 | 8/1974 | Baviello, Sr. | 138/97 |
| 3,834,421 | 9/1974 | Daley | 138/97 |
| 3,946,761 | 3/1976 | Thompson et al. | 138/98 |
| 4,067,349 | 1/1978 | Austin et al. | 138/97 |
| 4,572,228 | 2/1986 | Larson et al. | 138/15 |
| 4,581,085 | 4/1986 | Wood | 138/97 X |
| 4,627,471 | 12/1986 | Parkes et al. | 138/97 |
| 4,643,855 | * 2/1987 | Parkes et al. | 138/97 X |
| 4,646,787 | * 3/1987 | Rush et al. | 138/97 X |
| 4,691,728 | * 9/1987 | Mathison | 138/97 X |
| 4,723,579 | 2/1988 | Hyodo et al. | 138/119 |
| 4,954,016 | 9/1990 | Storgard | 405/184 |
| 4,995,761 | 2/1991 | Barton | 138/97 X |
| 5,027,895 | 7/1991 | Barton | 138/97 X |
| 5,167,258 | 12/1992 | Rice | 138/98 |
| 5,199,463 | * 4/1993 | Lippiatt | 138/93 X |
| 5,767,400 | 6/1998 | Nakano et al. | 73/152.46 |
| 5,915,419 | * 6/1999 | Tweedie et al. | 138/98 |
| 5,950,682 | * 9/1999 | Kiest, Jr. | 138/98 |
| 5,954,903 | 9/1999 | Rice | 156/156 |
| 6,039,079 | * 3/2000 | Kiest, Jr. | 138/98 |
| 6,044,867 | * 4/2000 | Tweedie et al. | 138/98 |
| 6,068,725 | * 5/2000 | Tweedie et al. | 138/98 |

OTHER PUBLICATIONS

LKM Enterprises, Inc. brochure, "Liner," (4 pages).
Sewer Equipment Co. of Florida, Inc. ad flyer, "The J Pipe Plug," (1 page, front and back).
American Logiball, Inc. brochure, "Logiball Lateral Injection Packers," (17 pages).
BJR Trading ApS brochure, "BJR Spot Repair System," (4 pages).
American Logiball ad folder, "The Leader in Grouting Packers," (2 pages).
American Logiball brochure, "Securimax Plugs—Redesigned for Maximum Strength," (4 pages).
SAWA ad flyer, "Sava Professional Environment Protection Program," (2 pages).

* cited by examiner

Primary Examiner—Patrick Brinson
(74) Attorney, Agent, or Firm—Laura G. Barrow

(57) ABSTRACT

Novel packers for repairing ruptures in straight-line conduit systems as well as lateral conduit lines are described and illustrated herein.

47 Claims, 7 Drawing Sheets

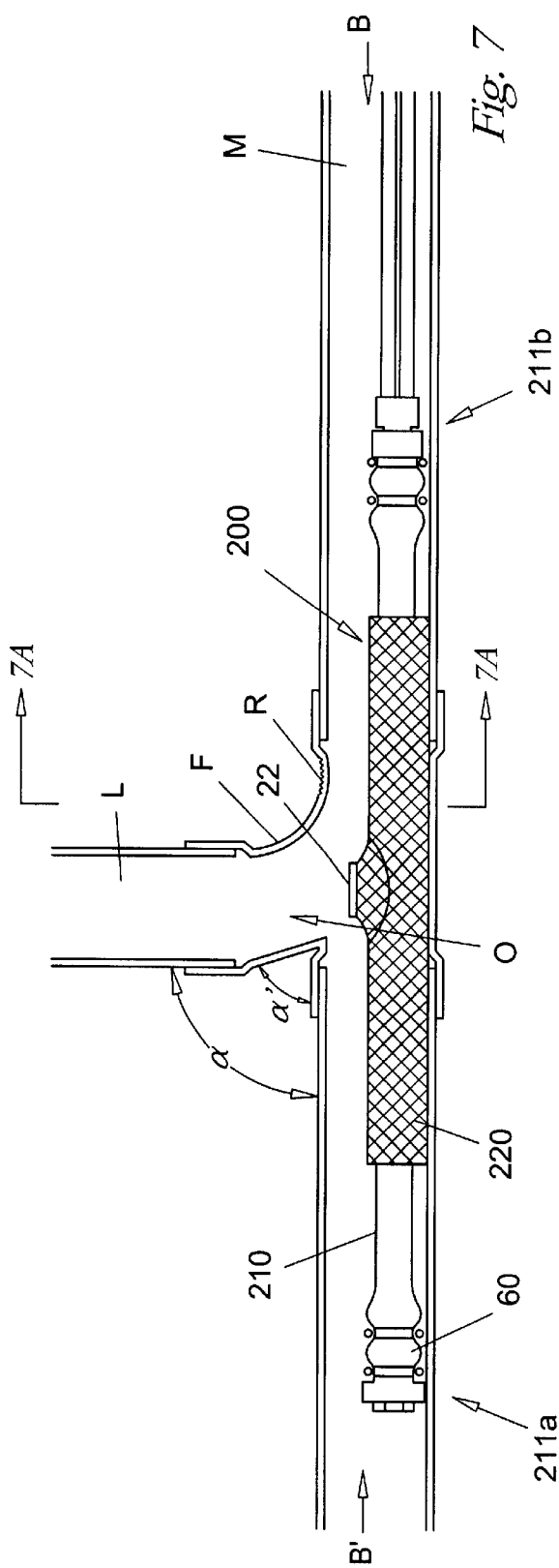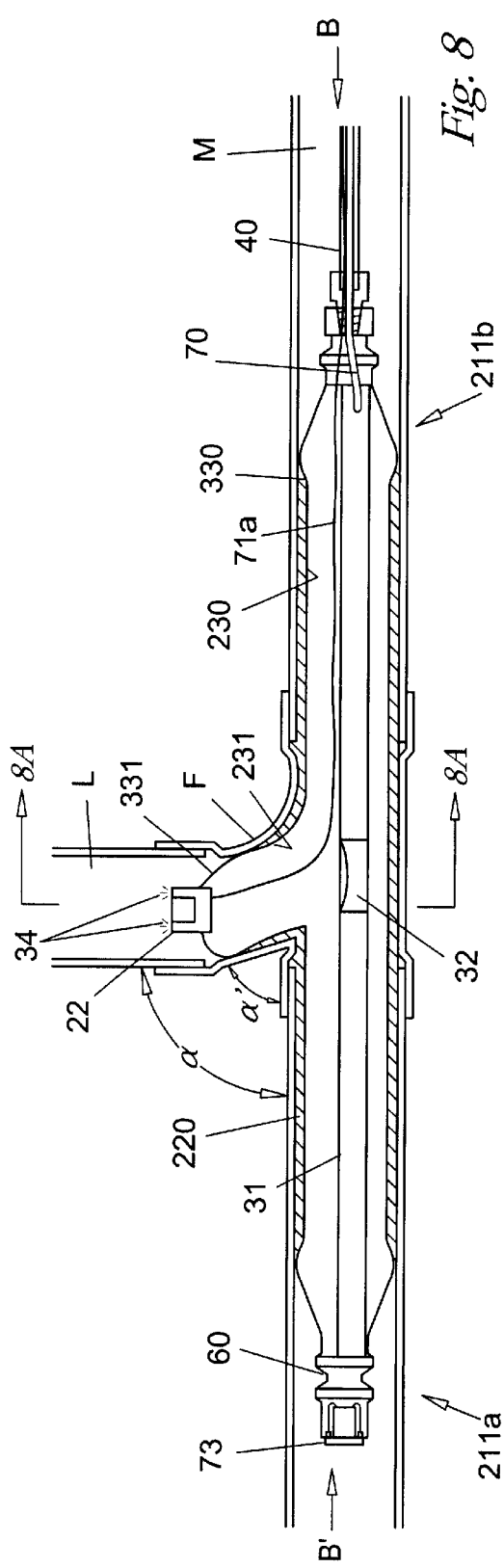

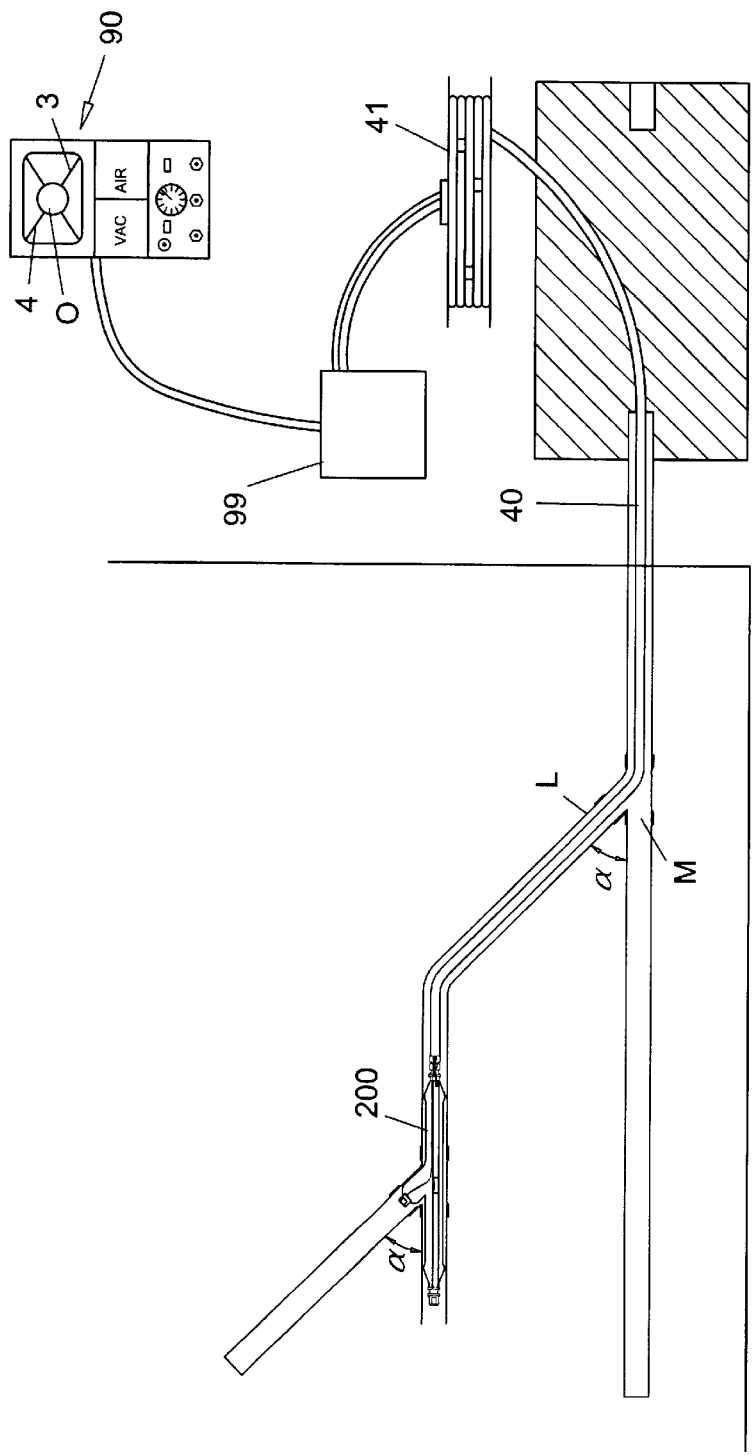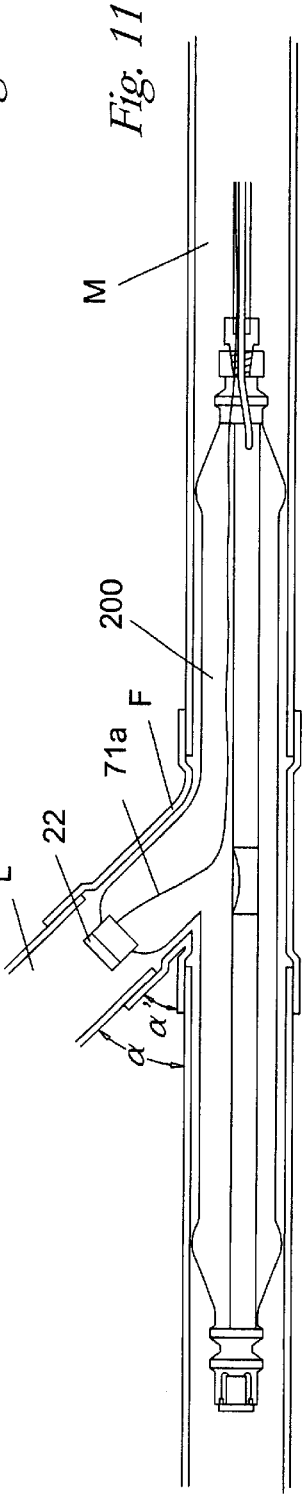

INFLATABLE PACKER FOR REPAIRING CONDUITS

BACKGROUND

Over the years that are have been several methods and devices used to repair ruptures in underground water and sewer mains. Point repair is a means used to reline cracked or broken areas of various types of conduits, primarily sewer lines, that does not require removal of the damaged conduit. Point repair is generally used to reline small areas of pipe that are damaged and may also be used to repair the entire line.

In order to locate the rupture within a conduit system, a small video camera mounted to a cable is introduced into the system lines. If a rupture is located, the distance from the opening of the conduit to the rupture is measured in order to accurately align the point repair device proximate the rupture.

A very common repair process involves first saturating a repair material or "sleeve" with an adhesive bonding material such as an epoxy. The sleeve is then wrapped around or pulled over an inflatable bladder commonly known by those of skill in the art as a "packer." The packer is then pulled, via cables attached to either or both ends of the packer, to the damaged area within the conduit. Once the bladder is oriented proximate the rupture, the bladder is inflated by means of an air pump, the air pump connected to the interior of the bladder via a hose. As the bladder expands, the sleeve is pressed against the interior conduit wall and the rupture therein to cover or fill in the rupture. When the epoxy impregnated repair hardens, the packer is deflated and pulled out of the conduit, thereby leaving a new repair pipe in place. This becomes a permanent repair and, in most cases, is stronger than the original pipe.

The present invention, in certain embodiments, is directed to an improved point repair packer and method for repairing conduit ruptures.

BRIEF DESCRIPTION OF FIGURES

FIG. 7 is a side view of another embodiment of a packer designed for lateral conduit repair.

FIG. 8 is a cross section side view of the packer shown in FIG. 7 in an inflated state.

FIG. 10 is another section view of a conduit system wherein a packer designed for lateral conduit repairs is employed.

FIG. 11 is a side section view of another packer designed for lateral conduit repairs wherein the packer is in an inflated state within the conduits.

DETAILED DESCRIPTION OF THE PREFERRED EMBODIMENTS

Figure 1:
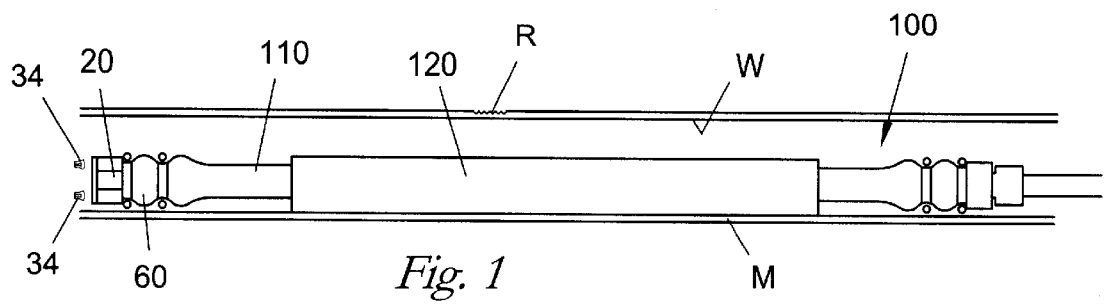
FIG. 1 is a side view of one embodiment of the packer, in a deflated state, within a conduit.

The present invention is directed in part to novel packers designed to repair ruptures in conduit systems, in particular underground conduit systems. Depending upon the location of the rupture and the design of the conduit system, a packer is selected having the desired configuration and camera placement, as discussed in more detail below.

Referring now to the figures, the packers (100,200) of the present invention comprise an inflatable bladder (110, 210) having two opposing ends (111a–111b, 211a–211b), an adhesive-coated sleeve (120,220) surrounding the bladder, and one or more cameras (20, 22, 23) secured thereto, as discussed further below. Thus, the term "packer," as used herein, shall mean the combination inflatable bladder, adhesive sleeve, camera(s), and any additional devices contained within, secured to, or mounted onto the bladder such as the control rod (40), inner tray (30, 31), and any intermediate sleeves disposed between the bladder and the adhesive sleeve surrounding the bladder, for example. "Packer components," as used herein, shall mean those devices secured to one or both ends of the inner tray (30, 31) of the packer, as discussed in more detail below.

The inflatable bladder (110, 210) in all embodiments may be formed of any suitable, elastomeric material such as rubber. A preferred elastomeric material for optimum flexibility is a soft rubber having a working pressure of from 8 to 20 psi, such as that used in truck inner tubes, for example. As discussed in more detail below, the tray (30, 31) is required if a vacuum unit is employed to the packer and/or the bladder is formed of a soft elastomeric material having a low working pressure (i.e. 8–20 psi).

In all embodiments, the packer includes a flexible adhesive sleeve (120,220) formed of a suitable repair material. The sleeve may be wrapped around the outer surface of the bladder, or the bladder may be inserted through a preformed sleeve. Conventional packer sleeves known by those of ordinary skill in the art, such as those disclosed in U.S. Pat. No. 4,995,761 to Barton and which is incorporated herein by reference in its entirety, may be used. Preferred repair materials for fabricating the flexible sleeve (120,220) includes KEVLAR, graphite, and/or fiberglass. The sleeve (120,220) may comprise at least one, and more preferably multiple, layers of one or more of the repair materials. To provide the necessary adhesiveness, the sleeve is dipped into a suitable adhesive bonding substance, such as an epoxy. To prevent the sleeve from adhering to the bladder, an intermediate sheet or sleeve of flexible material (not shown), such as cellophane or similar polyplastic material, may be first wrapped around the bladder. The adhesive-coated sleeve (120, 220) is then placed around the intermediate sheet of cellophane or polyplastic material. Alternatively, a non-sticking chemical substance, such as silicone and/or wax, may be applied directly to the bladder and/or sleeve to prevent the adhesive-coated sleeve from adhering to the bladder upon deflation of the bladder.

Figure 2:
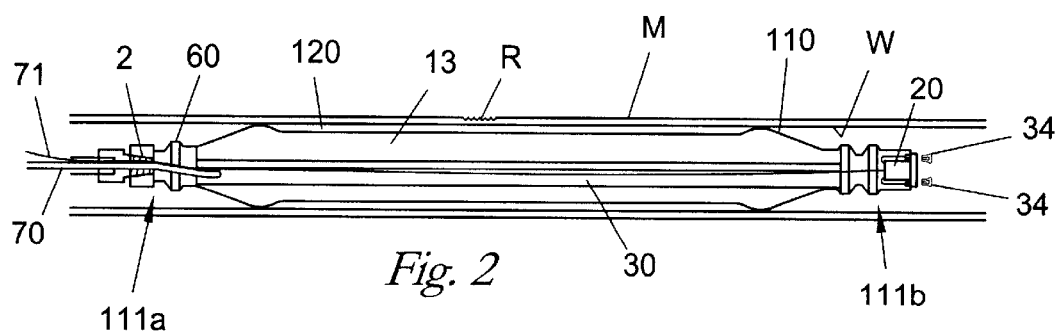
FIG. 2 is a side cross section view of one embodiment of an inflated packer within a conduit.
Figure 3:
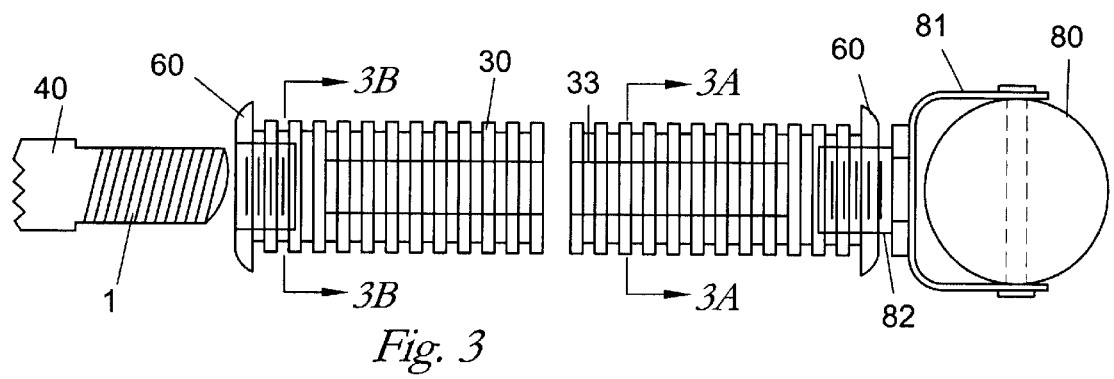
FIG. 3 is a top view of the inner tray with a roller attached thereto.
Figure 3A:
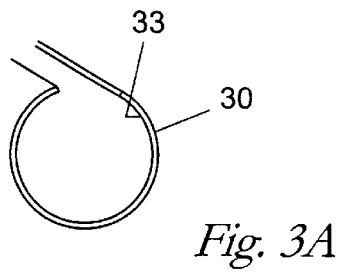
FIG. 3A is a cross-section of the tray taken along lines 3A—3A of FIG. 3.
Figure 3B:
FIG. 3B is a cross-section of the tray taken along lines 3B—3B of FIG. 3.
Figure 7A:
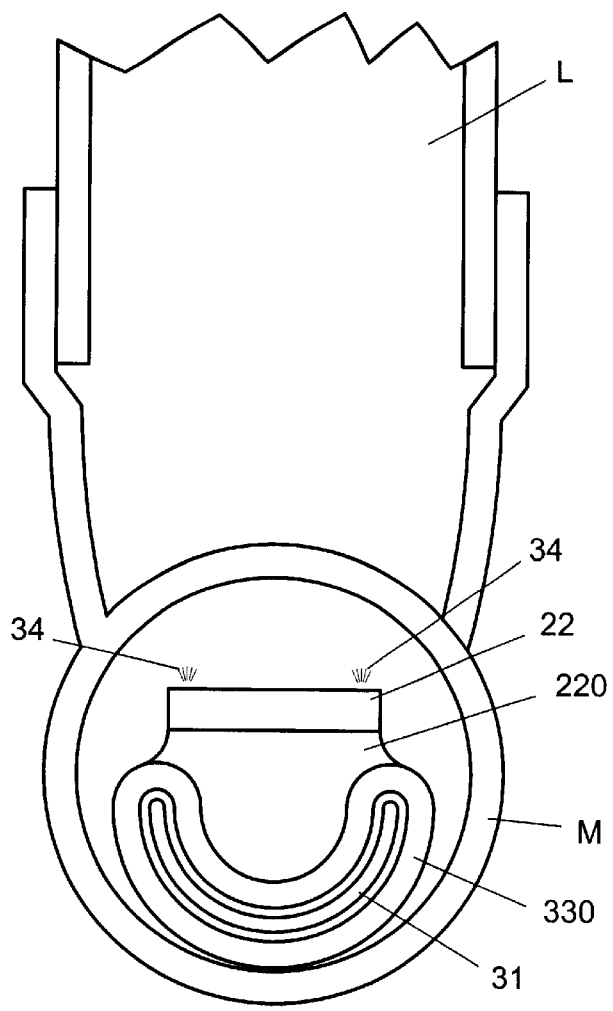
FIG. 7A is a section view of the packer taken along lines 7A—7A of FIG. 7.
Figure 8A:
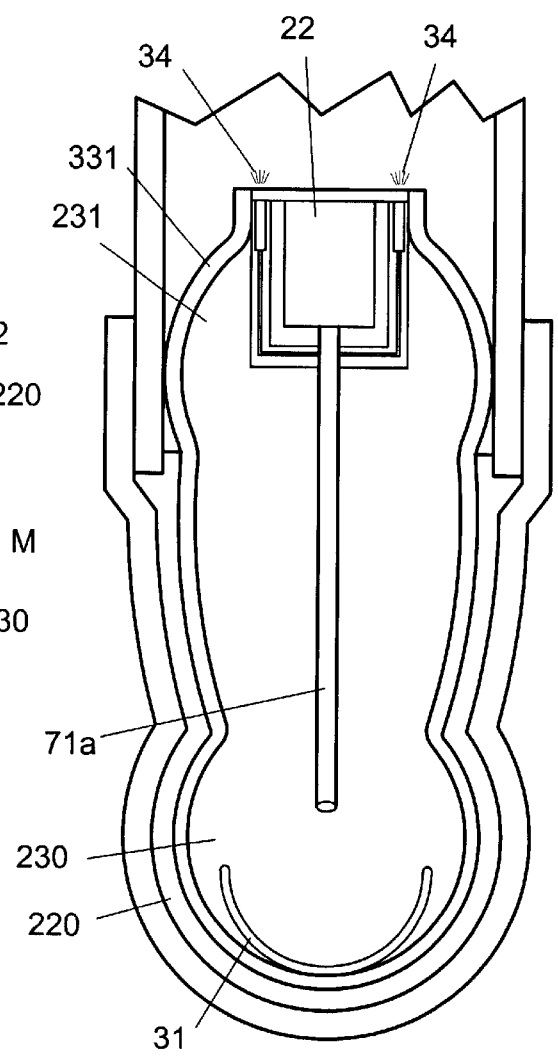
FIG. 8A is a section view of the packer taken along lines 8A—8A of FIG. 8.

The packer (100) illustrated in FIGS. 1–2 is preferred where the conduit rupture is not located in close vicinity to a lateral conduit opening (O) (FIG. 7). The packer in this embodiment preferably includes a flexible C-shaped inner tray (30) disposed within the inner compartment (13) of the bladder (11). The tray (30) preferably has at each end a collar fitting (60) to which the bladder is secured (see FIGS. 3A–3B). A camera (20) may be secured to one end of the packer, preferably via the inner tray collar fitting (60), as shown in FIGS. 1–2. The collar fitting (60) may comprise a threaded female potion (2) for engagement with a threaded male portion (not shown) of the camera, for example, or the male threaded portion (1, 82) of other packer components, including, but not limited to, a plug (73), control rod (40), or roller bracket (81). (FIGS. 3 and 3B). Alternatively, the camera may mounted to the control rod (40) via a flexible arm (44), as shown in FIG. 4 and discussed in more detail below.

The inner tray (30,31) in all embodiments is formed of a semi-rigid plastic or metal material that allows the packer to bend when a rupture is located at an elbow (E) in the conduit, or where the packer must travel through an elbow or similarly angled portions of a conduit to reach or locate a rupture present in a distant conduit line. The C-shape of the tray defines an inner channel (33) disposed between the two collar fittings (60). In the deflated state, the bladder and sleeve may be stored within the channel of the tray and further vacuumed down tightly therein, as discussed in more detail below.

Figure 9:
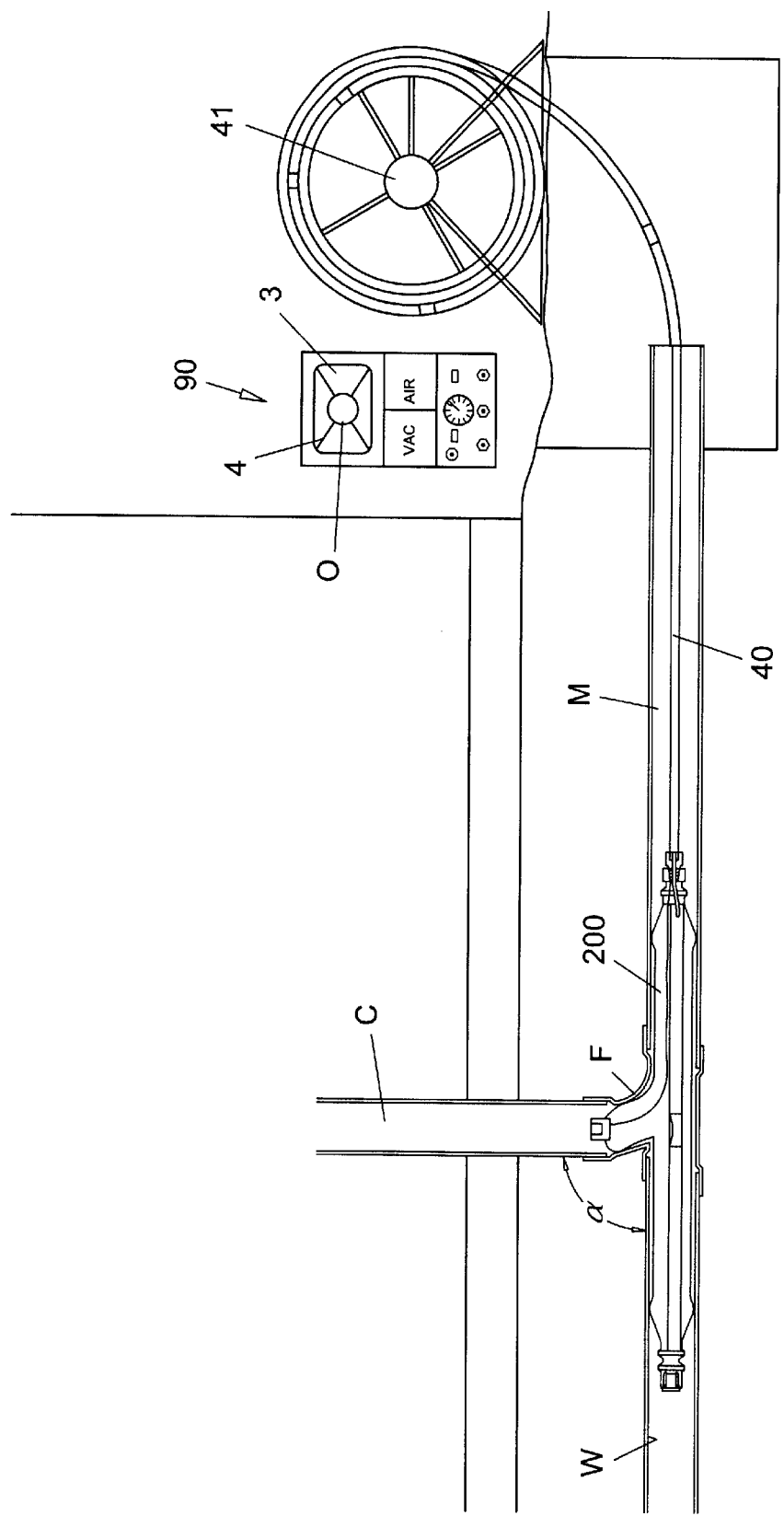
FIG. 9 is a section view of a conduit system wherein a packer designed for lateral conduit repairs is employed.

Connected to one end of the tray is a control rod (40) which allows the operator to push the packer through the conduit system, thereby obviating the need for locating an additional entrance in order to employ cables for pulling the packer through the conduit system, the latter of which is the current method for maneuvering repair packers through conduit systems. The control rod (40) may be several feet in length and stored on a reel (41) or in sections (FIG. 9). The control rod (40) may be attached to one end of the packer via any conventional means; however, the embodiments illustrated in the figures employ a tray (30) having a threaded female collar fitting (2) configured to receive the male threaded portion (1) of the control rod (40) (FIG. 3–3B).

Figure 4:
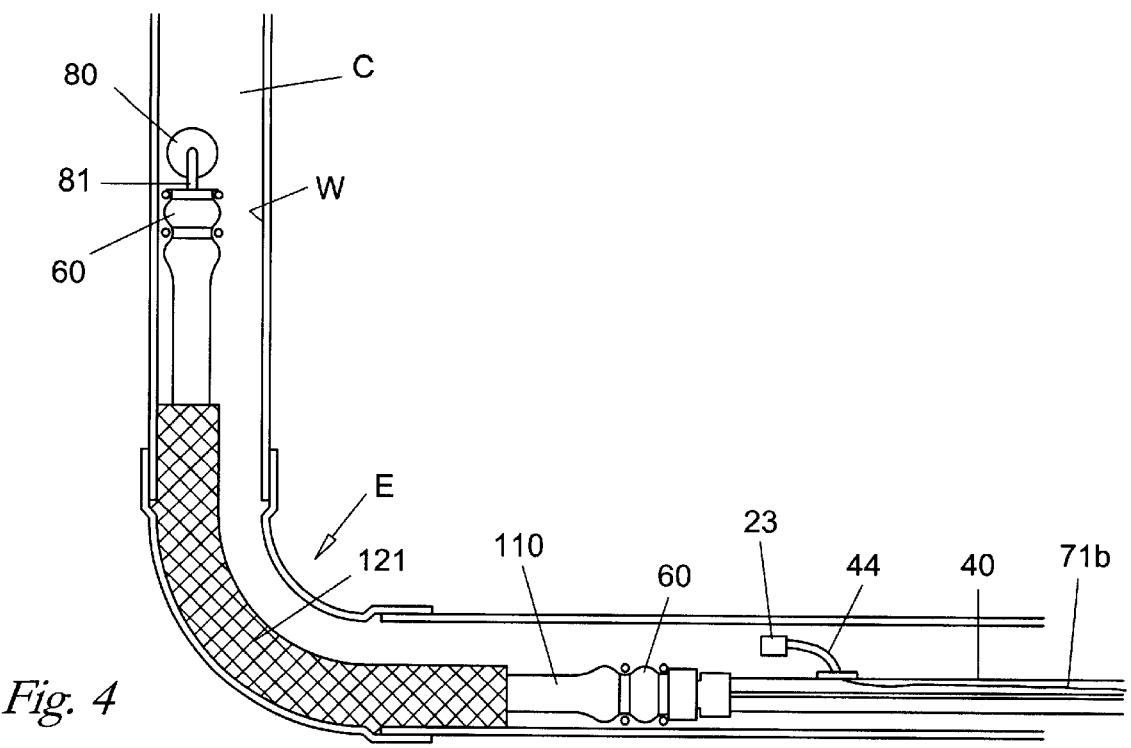
FIG. 4 is a side view of one embodiment of the packer, in a deflated state, within an elbow of a conduit.

In embodiments employing a camera mounted directly onto the control rod (FIG. 4), a roller (80) may be mounted to the opposite end of the tray within the packer to assist in maneuvering the packer through the conduit system, thereby allowing the packer to more easily move over rough surfaces, ruptures, and pipe fittings that may otherwise impede the movement of the packer (FIGS. 3–4). The roller (80) may be mounted to the tray (30) via a bracket (81). As for the camera (22) shown in FIGS. 1,2, and 6 and the control rod (40), the bracket (81) may comprise a threaded male portion (82), shown in phantom lines (FIG. 3) for engagement within a complementary female threaded collar fitting (60) of the tray (30).

Preferably, a packer having a narrow diameter prior to inflation is desired to maneuver through small diameter conduits as well as conduit lines having a series of bends. In order to achieve this small diameter while at the same time provide sufficient repair material for an adequate repair, the packer is connected to a vacuum pump. The vacuum pump may be separate from the air pump (not shown) or may be contained in a single unit in combination with the air pump, as shown in FIG. 9. Prior to introducing the packer inside the conduit, the bladder is vacuumed down tightly into the tray channel (33). The additional portion of the sleeve and any intermediate non-sticking sheet are then manually stuffed down into the tray channel (33) and tied down with a fastening material (e.g. string, rubber band, etc.) (not shown). The C-shape configuration of the channel (33) shown in FIG. 3A is particularly conducive to maintaining the extra sleeve and bladder material therein, thus preventing the sleeve from slipping off the tray as the packer travels through the conduit system. Upon subsequent inflation, the fastening material will break away. In smaller conduits having diameters ranging from less than six inches, where it is generally very difficult to repair ruptures therein with current point repairs systems on the market, the packer of the present invention may be vacuumed down to a diameter of about 1.5 inches to 2.0 inches for entry therein. In such embodiments, the tray diameter is from 1.0 to 1.5 inches.

Figure 6:
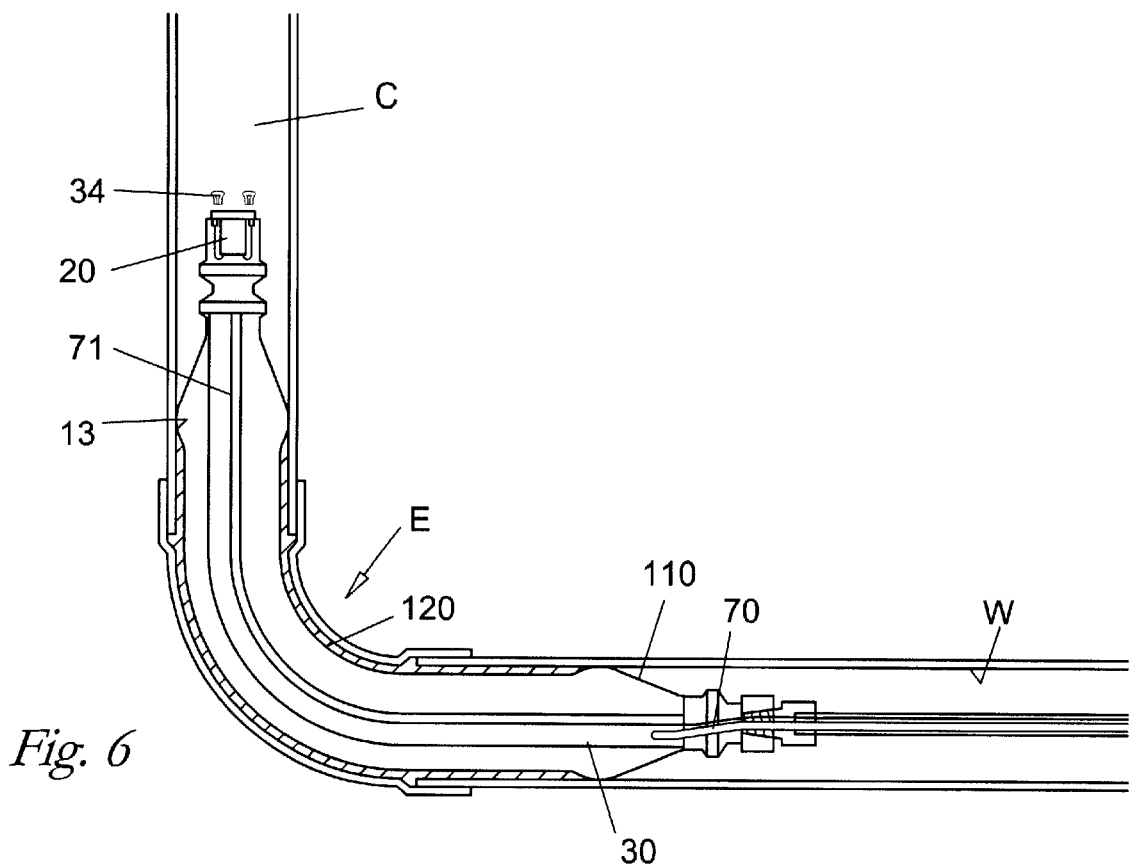
FIG. 6 is a side cross section view of one embodiment of an inflated packer within the elbow of a conduit.

In the deflated or more preferably, "vacuumed down" state, the packer (100) is introduced into an underground conduit line, generally a main conduit line (M), to inspect for any ruptures in need of repair. After the ground near the opening of the conduit is excavated, the packer is fed through the conduit opening via the flexible control rod (40), as discussed above. The camera (20) located on the end of the packer, as shown in FIGS. 1–2, and 6, for example, or on the control rod (40), as shown in FIG. 4, is used to view, via a separate camera monitor (3), the inner wall (W) of the conduit to locate ruptures and lateral conduit openings. If a rupture (R) is located along a straight portion of the conduit such that it can be repaired without occluding any lateral line openings (see FIGS. 1,2, and 4), the packer (100) in FIGS. 1–2 may be immediately employed to repair the rupture. Once the packer is oriented proximate the located rupture, as viewed in the camera monitor (3), the bladder is inflated by means of an external air pump (90) via a hose (70). As the bladder expands, the adhesive-coated sleeve (120) expands and mechanically adheres to the entire circumference of a portion of the inner wall (W) of the conduit to cover the rupture with the adhesive sleeve, thereby creating a layer of repair pipe comprising the adhesive sleeve. The bladder is then deflated, preferably by drawing a vacuum as discussed above.

Figure 5:
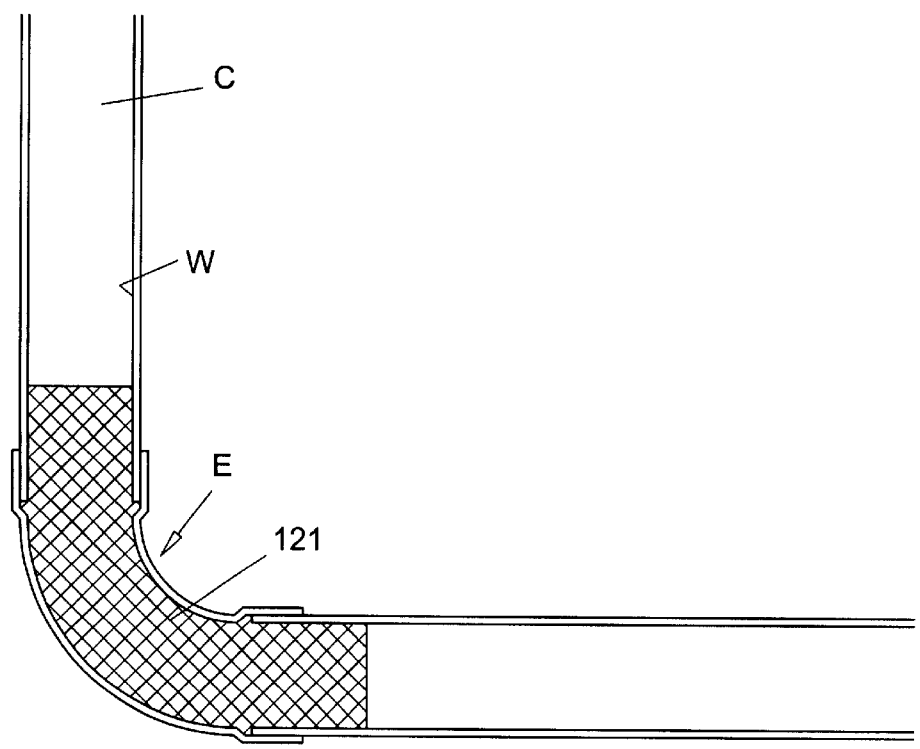
FIG. 5 is a side view of a repair sleeve within the elbow of the conduit shown in FIG. 4.

If, however, the rupture is located in an elbow (E) of a conduit system (FIGS. 4–5), the packer (100) illustrated in FIGS. 1–2 is preferably withdrawn and provided with an adhesive-coated sleeve (121) designed to conform to the shape of the elbow upon inflation. A preferred sleeve configuration for a rupture present in an 90-degree elbow (E) is that shown in FIGS. 4–5, for example. Here, the sleeve (121) is pre-constructed such that it conforms to the shape of the conduit elbow (E). Thus, for a 90-degree elbow, the sleeve has a substantially 90-degree angle or "L-shape." When the bladder is inflated within the conduit elbow, the L-shaped sleeve expands to better conform to the shape of the L-shaped conduit elbow. The sleeve may be constructed by cutting sheets of repair material into the desired shape of the final sleeve (e.g. L-shape). Two components, each comprising one or more sheets of the cut repair material, are then fastened or sewn together along their respective outer edges to form the sleeve. Alternatively, one or more layers of repair material may be woven into the desired shape, which may be more or less than 90 degrees, depending upon the angle of the elbow. Use of this improved flexible adhesive sleeve design in conduit elbow repairs is a significant improvement over a straight, elongated tubular sleeve, since repair with the latter sleeve often results in gaps between the sleeve and conduit inner wall, thereby weakening the repair. Thus, employing a sleeve that is pre-constructed to conform to the conduit configuration (e.g. an L-shaped conduit elbow) allows for a complete mechanical bond at the elbow of an angular conduit. FIG. 4 illustrates one packer within an elbow of a conduit (C) prior to inflation, wherein a roller (80) is employed at one end of the tray. After a time sufficient to allow the sleeve (12) to harden (i.e. about 3 hours), the bladder/tray combination is removed via the control rod (40) and the resulting repair sleeve (121) remains mechanically bonded to the conduit wall (W), as shown in FIG. 5. It will be appreciated by those of skill in the art that the sleeve may be pre-constructed at angles of greater or less than 90 degrees to accommodate similarly angled conduit bends having ruptures in need of repair.

The present invention is also directed to a novel packer design that is conducive to repairing conduit ruptures located near a connecting lateral conduit line (L), as shown in FIGS. 8–11. Specifically, the packer (200) is designed such that a repair can be made without occluding the lateral conduit line opening, thereby obviating the need to re-enter the repaired conduit line with a cutting machine to re-open the lateral opening. The same materials used for the bladder, adhesive coated sleeves, and inner tray are also employed for this embodiment.

Referring now to FIGS. 7–8, 7A–8A, and 9–11, the bladder (210) comprises two sections: a first elongated section (330) having an inner compartment (230) and a second section (331) integral with the first section (330) and disposed between the two opposing ends (211a, 211b) of the first bladder section. The inner compartment (230) of the first section and inner compartment (231) of the second section of the bladder sections are in open communication with one another. An adhesive-coated sleeve (220) as described above for other packer designs is used; however, the sleeve is further configured to conform to the shape of the bladder (i.e., the sleeve has two sections corresponding to the respective sections (330, 331) of the bladder). A camera (22) is secured to the second bladder section (331) and is used to locate lateral conduit openings (O). The second camera (22) is also used to locate any ruptures located within the lateral conduit line (L). If a lateral conduit opening (O) is located using this packer design, the camera (22) is aligned in registration with the lateral conduit opening (O). The alignment of the camera may be more easily achieved via cross hairs (4) on the outside camera monitor (3) (FIGS. 9–11). Once aligned, the packer (200) is inflated, thereby causing the adhesive-coated sleeve (220) on the first bladder section to expand and mechanically adhere to the inner wall (W) of the main conduit line (M) to cover any ruptures adjacent the lateral conduit opening (O). Simultaneously, the second bladder section (331) is inflated and subsequently enters into the lateral conduit line (L) through the lateral conduit opening (O). Any ruptures (R) present in the lateral conduit line within reach of the second bladder section will also be covered by the adhesive-coated sleeve. Upon deflation of the bladder, the ruptures are adequately repaired within a larger repair sleeve without occluding the lateral conduit opening (O). Thus, repairs can be made simultaneously to ruptures found in both the main and lateral conduit lines, with the same packer and without occluding the opening of the intersecting lateral conduit line.

As discussed above, an inner tray (30, 31) is preferably used in all embodiments of the packers described herein. In the embodiments illustrated in FIGS. 7–11, however, the inner tray (31) is further provided with a recess compartment (32) for storing the camera when the packer is in the deflated/vacuumed-down position. The inner tray (30, 31) in all embodiments may also be provided with threaded collar fittings (60) at both ends, as discussed above, to engage the packer components such as a control rod (40), a camera (22), a roller (80), or a plug (73). Provision of a uniform threaded collar fitting (60) at both ends of the tray (31) allows for interchangeability of these packer components (i.e. the rod, camera, roller, plug). Such interchangeability is particularly desirable with respect to the embodiments in FIGS. 7–11, for example, where it may not be possible to enter the conduit system through conduit end (B) as shown, but instead, entry must be made through conduit end (B$^1$). In such a situation, it is not possible to simply turn the packer around since the second bladder section (331) will not be properly aligned within the lateral conduit opening (O)—that is, the second bladder section (331) would be oriented or angled in the wrong direction. Thus, the orientation of the bladder (210) within the conduit as shown in FIGS. 7–8 may be maintained by simply connecting the control rod (40) to the opposite end (211a) of the tray (31). If a roller (80) is employed in this embodiment, it may also be secured to the end (211a) of the tray opposite the control rod end (211b), regardless of which end the control rod is fastened, due to such interchangeability of components as thus described.

The packer (200) shown in FIGS. 7–11 may be designed to accommodate lateral conduit lines that are connected to main lines at various angles. For example, for a conduit system wherein the lateral line is oriented at a 90-degree angle ($\alpha$) with respect to the main conduit line (M) (see FIGS. 7–10), a packer of the present invention may be used wherein the second bladder section is oriented at an angle with respect to the first bladder section to accommodate the sweeping angle ($\alpha^1$) of the conduit fitting (F) connecting the main line to the lateral conduit line. Similarly, wherein lateral conduit lines are oriented at other angles with respect to the main conduit line (e.g. 45 degrees (FIG. 11) and 22 degrees (not shown)), a packer of the present invention may be designed wherein the second bladder section (331) is oriented at an angle with respect to the first bladder section (330) to accommodate the sweeping angle ($\alpha^1$) of the conduit fitting (F).

While it will readily be readily appreciated by those of skill in the art that one advantage of the present invention is the incorporation of one or more cameras directly to the tray or one of the packer components (e.g. control rod), such that repairs may be made simultaneously without having to remove the packer, it will also recognized that the first packer used to locate ruptures and lateral lines may not be deemed the most desirable to use for a particular repair. For example, using the packer (100) illustrated in FIGS. 1–2, the operator might locate a rupture in a main conduit line (M) near a lateral conduit opening (O), thereby necessitating the use of the packer (200) in FIGS. 7–11, for example. Nevertheless, even in these situations where a packer must be substituted, provision of a camera directly to the inner tray or control rod of the packer allows for precise location of the rupture and the subsequent ability to repair that rupture immediately. This is a distinct advantage over existing art, wherein after a rupture is located with a separate video camera, a measurement must be calculated, the camera removed, and then the packer introduced a distance within the conduit to the calculated point of repair. If a miscalculation is made, the rupture may be missed, thereby adding additional time and cost to the repair process. The current invention does not require any calculations to be made, and thus provides for a 100% accurate placement of the packer at the point of repair.

As discussed above, it is preferable that both an air pump and vacuum unit be used for the inflation and deflation of the inventive packer once the packer is placed in the correct position within a conduit line. Preferably, a combination vacuum/air pump unit (90) is connected to the packer via a hose (70) that may be fed through control rod as shown, or connected to the packer outside of the control rod (not shown). The vacuum/air pump may be powered by any conventional power source (99), including, but not limited to, a battery, an electric generator, or any other electrical power source. The vacuum/air pump (90) may contain a variety of controls, including a main power switch, an air adjustment control, a vacuum adjustment control, an air pressure gauge, and a power switch.

Moreover, the vacuum/air pump unit (90) may further include a camera monitor (3) for viewing the interior of the conduit system. Alternatively, the video monitor may be a separate unit (not shown) as discussed above. The camera mounted on the tray or control rod preferably includes at least one light (34) that may be controlled on the vacuum/air pump (90). The camera is connected to the monitor (3) via a cable or series of wires (71, 71a, 71b) that are fed through the control rod (41) as shown or outside of the control rod (not shown). When two or more cameras are employed, separate video monitors may be employed per camera. Alternatively, one video monitor may employed for all cameras, provided the video monitor is capable of either providing split screen viewing or separate channel corresponding to each camera.

The foregoing disclosure and description of the invention are illustrative and explanatory thereof, and various changes in the size, shape, and materials, as well as in the details of the illustrated construction, may be made without departing from the spirit of the invention. It is thus contemplated that one of ordinary skill in the art, having the benefit of this invention's teachings and suggestions, may employ alternate arrangements and configurations of the elements of the packers described and illustrated herein as well as the devices used to operate these packers.

In the claims:

1. A packer for repairing ruptures in conduits, said packer comprising:
   a. an inflatable bladder having an inner compartment;
   b. a flexible sleeve surrounding a portion of said bladder, said sleeve including an adhesive bonding substance suitable for repairing conduit ruptures;
   c. an inner tray having first and second opposing ends and disposed within said inner compartment of said bladder, said bladder further secured at each end to one of said first and second ends of said inner tray; and
   d. a camera secured to said first end of said inner tray, said camera oriented such that an operator can view an interior wall of the conduit as said packer is moved within said conduit.

2. The packer of claim 1, further including a control rod secured to said second end of said inner tray.

3. The packer of claim 1, wherein said inner tray comprises a C-shaped channel for storing a portion of said bladder and sleeve prior to inflation of said bladder.

4. The packer of claim 3, wherein said inner tray includes at each of said first and second ends an interchangeable collar fitting for engaging a packer component.

5. The packer of claim 4, wherein said packer component is selected from a camera, a control rod, a roller, and a plug.

6. The packer of claim 4, wherein said interchangeable collar fitting comprises a female threaded portion for engaging a complementary male threaded portion of said packer component.

7. The packer of claim 6, wherein said packer component is selected from a camera, a control rod, a roller, and a plug.

8. The packer of claim 1, wherein said sleeve is preconstructed to conform to a conduit elbow, such that upon inflation of said bladder, said sleeve conforms to said conduit elbow.

9. A packer for repairing ruptures in conduits, said packer comprising:
   a. an inflatable bladder having an inner compartment;
   b. a flexible sleeve surrounding a portion of said bladder, said sleeve including an adhesive bonding substance suitable for repairing conduit ruptures;
   c. a flexible inner tray having first and second opposing ends and disposed within said inner compartment of said bladder, said bladder further secured at each end to one of said first and second ends of said inner tray;
   d. a control rod secured to said first tray end; and
   e. a camera secured to said control rod.

10. The packer of claim 9, wherein said camera is secured to said control rod via a flexible arm.

11. The packer of claim 9, wherein said packer further includes a roller secured to said second tray end.

12. The packer of claim 9, wherein said inner tray comprises a C-shaped channel for storing a portion of said bladder and sleeve prior to inflation of said bladder.

13. The packer of claim 9, wherein said inner tray includes at each of said first and second ends an interchangeable collar fitting for engaging a packer component.

14. The packer of claim 13, wherein said packer component is selected from a camera, a control rod, a roller, and a plug.

15. The packer of claim 9, wherein said sleeve is preconstructed to conform to a conduit elbow, such that upon inflation of said bladder, said sleeve conforms to said conduit elbow.

16. A packer for repairing ruptures in conduits, said packer comprising:
   a. an inflatable bladder having an inner compartment;
   b. a flexible sleeve surrounding a portion of said bladder, said sleeve including an adhesive bonding substance suitable for repairing conduit ruptures; and
   c. a flexible inner tray having first and second opposing ends and disposed within said inner compartment of said bladder, said bladder further secured at each end to one of said first and second ends of said inner tray.

17. The packer of claim 16, wherein said inner tray includes at each of said first and second ends an interchangeable collar fitting for engaging a packer component.

18. The packer of claim 16, wherein said packer component is selected from a camera, a control rod, a roller, and a plug.

19. The packer of claim 16, wherein said interchangeable collar fitting comprises a female threaded portion for engaging a complementary male threaded portion of said packer component.

20. The packer of claim 19, wherein said packer component is selected from a camera, a control rod, a roller, and a plug.

21. An apparatus for repairing ruptures in conduits, said apparatus comprising:
   (a) a packer, said packer comprising (i) an inflatable bladder having an inner compartment; (ii) a flexible sleeve surrounding a portion of said bladder, said sleeve including an adhesive bonding substance suitable for repairing conduit ruptures; (iii) an inner tray disposed within said inner compartment of said bladder, said tray having a C-shaped channel and first and second opposing ends, and said bladder further secured at each end to one of said first and second ends of said inner tray; and (iv) a camera secured to said first end of said inner tray, said camera oriented such that an operator can view an interior wall of the conduit as said packer is moved within said conduit;
   (b) an air pump connected to said bladder to inflate said bladder once said bladder is oriented proximate said rupture within the conduit, whereby when said pump is activated, air is introduced into said inner compartment of said bladder to inflate said bladder, thereby causing said sleeve mounted thereon to expand and mechanically adhere to a portion of said interior wall of said conduit to cover said rupture; and
   (c) a vacuum unit connected to said bladder to remove air from the inner compartment of said bladder, thereby causing said bladder and sleeve mounted thereon to shrink down tightly into said tray channel.

22. The apparatus of claim 21, wherein said vacuum unit and said air pump are contained within a single unit.

23. The apparatus of claim 21, wherein said inner tray includes at each of said first and second ends an interchangeable collar fitting for engaging a packer component.

24. The apparatus of claim 23, wherein said packer component is selected from a camera, a control rod, a roller, and a plug.

25. The apparatus of claim 23, wherein said interchangeable collar fitting comprises a female threaded portion for engaging a complementary male threaded portion of said packer component.

26. The apparatus of claim 25, wherein said packer component is selected from a camera, a control rod, a roller, and a plug.

27. The apparatus of claim 16, where in said sleeve is pre-constructed to conform to a conduit elbow, such that upon inflation of said bladder, said sleeve conforms to said conduit elbow.

28. A packer for repairing ruptures in conduits, said packer comprising:
   (a) an inflatable bladder comprising (i) a first bladder section having an inner compartment and two opposing ends; and (ii) a second bladder section integral with said first bladder section, said second section having an inner compartment in communication with said inner compartment of said first bladder section, said second bladder section disposed between said two ends of said first bladder section;
   (b) an inner tray having first and second opposing ends and disposed within said inner compartment of said first bladder section, said first bladder section further secured at each end to one of said first and second ends of said inner tray
   (c) a camera secured to said second section of said bladder and positioned such that an operator can view, via a separate camera monitor, an interior wall of the conduit and locate an opening to a second lateral conduit connected to said first conduit as said bladder is moved within said first conduit, and
   (d) a sleeve surrounding a portion of said first and second bladder sections, said sleeve including an adhesive bonding substance suitable for repairing conduit ruptures.

29. The packer of claim 28, wherein said inner tray comprises a C-shaped channel for storing a portion of said bladder and sleeve prior to inflation of said bladder.

30. The packer of claim 29, wherein said inner tray has a recessed compartment for storing said camera when said bladder is deflated.

31. The packer of claim 29, further including a control rod secured to said second end of said inner tray.

32. The packer of claim 29, wherein said inner tray includes at each of said first and second ends an interchangeable collar fitting for engaging a packer component.

33. The packer of claim 32, wherein said packer component is selected from a camera, a control rod, a roller, and a plug.

34. The packer of claim 32, wherein said interchangeable collar fitting comprises a female threaded portion for engaging a complementary male threaded portion of said packer component.

35. The packer of claim 34, wherein said packer component is selected from a camera, a control rod, a roller, and a plug.

36. An apparatus for repairing ruptures in conduits, said apparatus comprising:
   (A) a packer, said packer comprising
      (a) an inflatable bladder comprising (i) a first bladder section having an inner compartment and two opposing ends; and (ii) a second bladder section integral with said first bladder section, said second section having an inner compartment in communication with said inner compartment of said first bladder section, said second bladder section disposed between said two ends of said first bladder section;
      (b) an inner tray having first and second opposing ends and disposed within said inner compartment of said first bladder section, said first bladder section further secured at each end to one of said first and second ends of said inner tray, said inner tray further having a C-shaped channel for storing a portion of said bladder and sleeve prior to inflation of said bladder;
      (c) a camera secured to said second section of said bladder and positioned such that an operator can view, via a separate camera monitor, an interior wall of the conduit and locate an opening to a second lateral conduit connected to said first conduit as said bladder is moved within said first conduit; and
      (d) a sleeve surrounding a portion of said first and second bladder sections, said sleeve including an adhesive bonding substance suitable for repairing conduit ruptures;
   (B) an air pump connected to said bladder to inflate said bladder once said camera is positioned proximate said lateral conduit opening, whereby upon inflation of said bladder, (i) said sleeve mounted on said first bladder section expands, and (ii) said second bladder section and portion of said sleeve mounted thereon expands into said lateral conduit opening, thereby causing said portion of said sleeve mounted on said second bladder section to cover any ruptures within said second lateral conduit without occluding said lateral conduit opening upon subsequent deflation of said bladder; and
   (C) a vacuum unit connected to said bladder to remove air from the inner compartment of said bladder, thereby causing said bladder and sleeve mounted thereon to shrink down tightly into said tray channel.

37. The apparatus of claim 36, wherein said vacuum unit and said air pump are contained within a single unit.

38. The apparatus of claim 36, wherein said inner tray includes at each of said first and second ends an interchangeable collar fitting for engaging a packer component.

39. The apparatus of claim 38, wherein said packer component is selected from a camera, a control rod, a roller, and a plug.

40. The apparatus of claim 38, wherein said interchangeable collar fitting comprises a female threaded portion for engaging a complementary male threaded portion of said packer component.

41. The apparatus of claim 40, wherein said packer component is selected from a camera, a control rod, a roller, and a plug.

42. The apparatus of claim 36, wherein said inner tray has a recessed compartment for storing said camera when said bladder is deflated.

43. The apparatus of claim 36, further including a control rod secured to said second end of said inner tray.

44. The apparatus of claim 42, wherein said inner tray includes at each of said first and second ends an interchangeable collar fitting for engaging a packer component.

45. The apparatus of claim 44, wherein said packer component is selected from a camera, a control rod, a roller, and a plug.

46. The apparatus of claim 44, wherein said interchangeable collar fitting comprises a female threaded portion for engaging a complementary male threaded portion of said packer component.

47. The apparatus of claim 46, wherein said packer component is selected from a camera, a control rod, a roller, and a plug.

* * * * *